United States Patent
Bush et al.

(10) Patent No.: US 8,224,926 B1
(45) Date of Patent: Jul. 17, 2012

(54) SYSTEM AND METHOD FOR OUTAGE AVOIDANCE

(75) Inventors: Craig M. Bush, San Antonio, TX (US); James E. Lutz, Pipe Creek, TX (US); Matthew G. Westerman, San Antonio, TX (US); Miguel A. Cortes, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 12/906,794

(22) Filed: Oct. 18, 2010

Related U.S. Application Data (63) Continuation of application No. 11/143,071, filed on Jun. 2, 2005, now Pat. No. 7,818,393.

(51) Int. Cl.
G06F 15/16 (2006.01)
G06F 15/167 (2006.01)
(52) U.S. Cl. ......... 709/217; 709/216; 709/219; 709/230
(58) Field of Classification Search .................. 709/217, 709/216, 219, 230
See application file for complete search history.

(56) References Cited

U.S. PATENT DOCUMENTS

| | | | |
|---|---|---|---|
| 5,812,763 A | 9/1998 | Teng | |
| 5,835,482 A | 11/1998 | Allen | |
| 6,643,262 B1 | 11/2003 | Larsson et al. | |
| 6,859,834 B1 | 2/2005 | Arora et al. | |
| 6,941,379 B1 * | 9/2005 | Dingsor et al. | 709/235 |
| 7,818,393 B1 * | 10/2010 | Bush et al. | 709/217 |
| 2001/0010053 A1 * | 7/2001 | Ben-Shachar et al. | 709/105 |
| 2003/0187946 A1 * | 10/2003 | Cable | 709/215 |
| 2004/0158766 A1 | 8/2004 | Liccione et al. | |
| 2005/0039069 A1 | 2/2005 | Prahlad et al. | |
| 2007/0136374 A1 * | 6/2007 | Guedalia | 707/104.1 |
| 2007/0208799 A1 | 9/2007 | Hughes | |
| 2008/0209258 A1 | 8/2008 | Casale et al. | |

* cited by examiner

*Primary Examiner* — Abdullahi Salad
*Assistant Examiner* — Richard G. Keehn
(74) *Attorney, Agent, or Firm* — Brooks Cameron & Huebsch, PLLC (57) ABSTRACT

Disclosed are systems and methods for outage avoidance in connecting to a remote system. The systems and methods dynamically adjust the number of requests allowed to attempt to access the remote system, resulting in a more efficient use of resources and an improved user experience.

21 Claims, 10 Drawing Sheets

SYSTEM AND METHOD FOR OUTAGE AVOIDANCE

CROSS-REFERENCE TO RELATED APPLICATIONS

This application is a continuation of U.S. application Ser. No. 11/143,071, filed Jun. 2, 2005, the specification of which is incorporated herein by reference.

FIELD OF THE INVENTION

Various embodiments of the present disclosure pertain to outage avoidance for a network and, more particularly, to a outage avoidance system which detects for outages between an application component and a remote system in order to enhance the efficient use of resources and the experience of a plurality of users connecting to the remote system using the application component.

BACKGROUND

The connecting of a user to a remote system using an application component is well-known and readily appreciated by those of skill in the art. Conventionally, a user may use a browser to communicate a request to a web server. The web server will take that request and communicate it to an application server which includes a predetermined or limited number of threads available for handling requests. The application server will allocate a thread to the request and then have the application component take that request and attempt to retrieve it from the remote system. However, as the number of available threads on the application server may be limited, the application server typically may only be able to handle predetermined number of requests before the requests are queued. In the event the remote system experiences an outage when there are a large number of requests, users may end up waiting a significant amount of time to find out that the remote system has experienced an outage, which can result in a diminished user experience. Furthermore, the allocation of threads and the queuing of requests to an unavailable remote system ties up resources which could be used more efficiently.

A conventional solution for this problem is the use of connection pooling, which involves the establishment of a pool of database connections between the application server and the remote system which can be shared by application components on the application server. This limits the creation of new connections because existing connections from the pool of database connections may be used, which saves resources. However, when the remote system goes down, the diminished user experience associated with the amount of time a user waits to find out that the remote system has experienced an outage remains.

Accordingly, it would be desirable to provide a system and method for outage avoidance absent the disadvantages found in the prior methods discussed above.

SUMMARY

Various embodiments of the present disclosure are directed to systems and methods for outage avoidance in connecting to a remote system. The systems and methods provide a means for dynamically adjusting the number of requests allowed to attempt to access the remote system, resulting an a more efficient use of resources and an improved user experience.

BRIEF DESCRIPTION OF THE DRAWINGS

FIG. 3b is a schematic illustrating an embodiment of a throttle used in the application server of FIG. 3a.

DETAILED DESCRIPTION

Figure 1A:
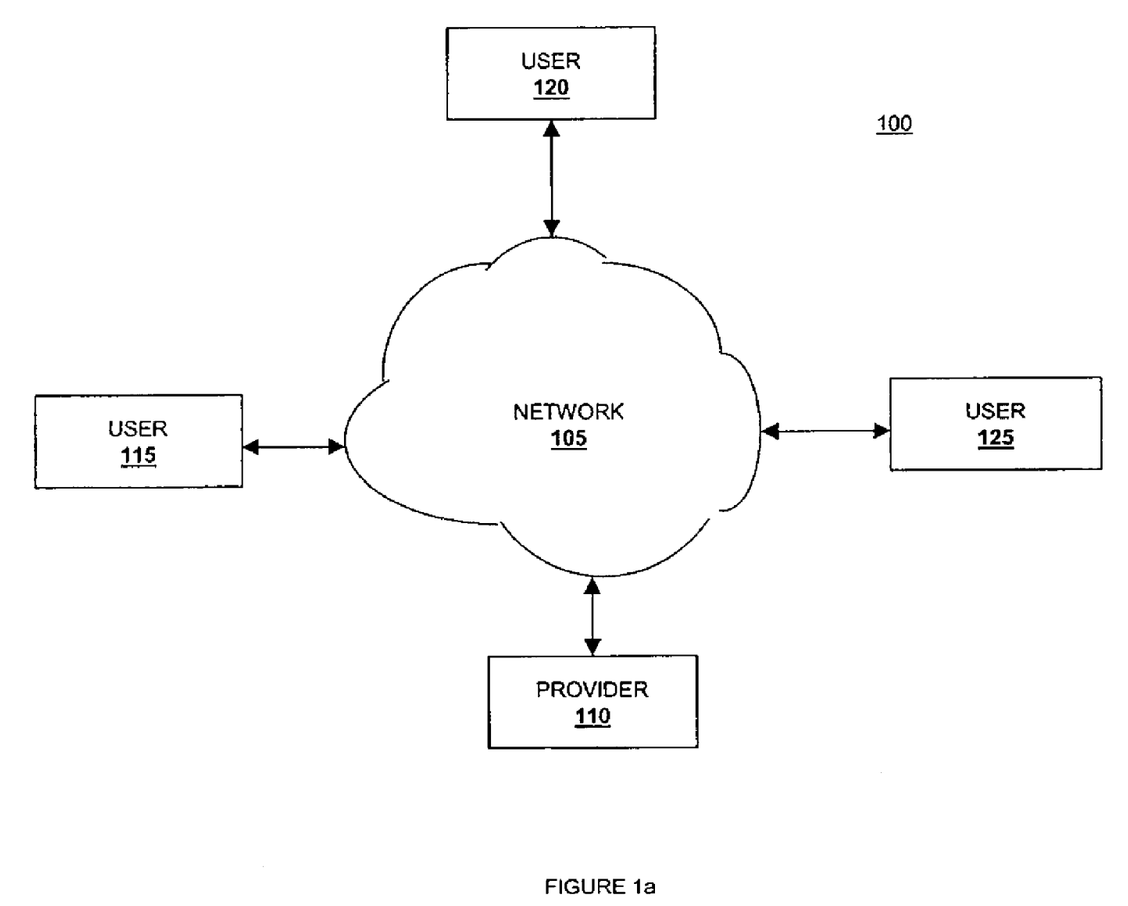
FIG. 1a is a block diagram illustrating an embodiment of a system.

Referring now to FIG. 1a, in one embodiment, a system for outage avoidance 100 is illustrated. The system 100 includes a computer network 105 such as, for example, a Transport Control Protocol/Internet Protocol (TCPIIP) network (e.g., the internet or an intranet.) A provider 110 is operably coupled to the network 105. A plurality of users 115, 120, and 125 are also operably coupled to the network 105 in order to allow communication between the users 115, 120, and 125 and the provider 110.

Each of the provider 110 and the users 115, 120, and 125 includes a respective network interface for communicating with the network 105 (e.g., outputting information to, and receiving information from, the network 105), such as by transferring information (e.g., instructions, data, signals) between such users and the network 105. Accordingly, through the network 105, the provider 110 communicates with the users 115, 120, and 125, and the users 115, 120, and 125 communicate with the provider 110.

For clarity, FIG. 1a depicts only one provider 110. However, the system 100 may include a plurality of providers which are substantially identical to the provider 110 and each other. Likewise, for clarity, FIG. 1a depicts only three users 115, 120, and 125. However, the system 100 may include a plurality of users which are substantially identical to the users 115, 120, and 125 and each other. In the discussion below, the user 115 is a representative one of the users 115, 120, and 125.

Each of the provider 110 and the users 115, 120, and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHS's are coupled to each other. Accordingly, the provider 110 and the users 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g. the network 105).

Figure 1B:
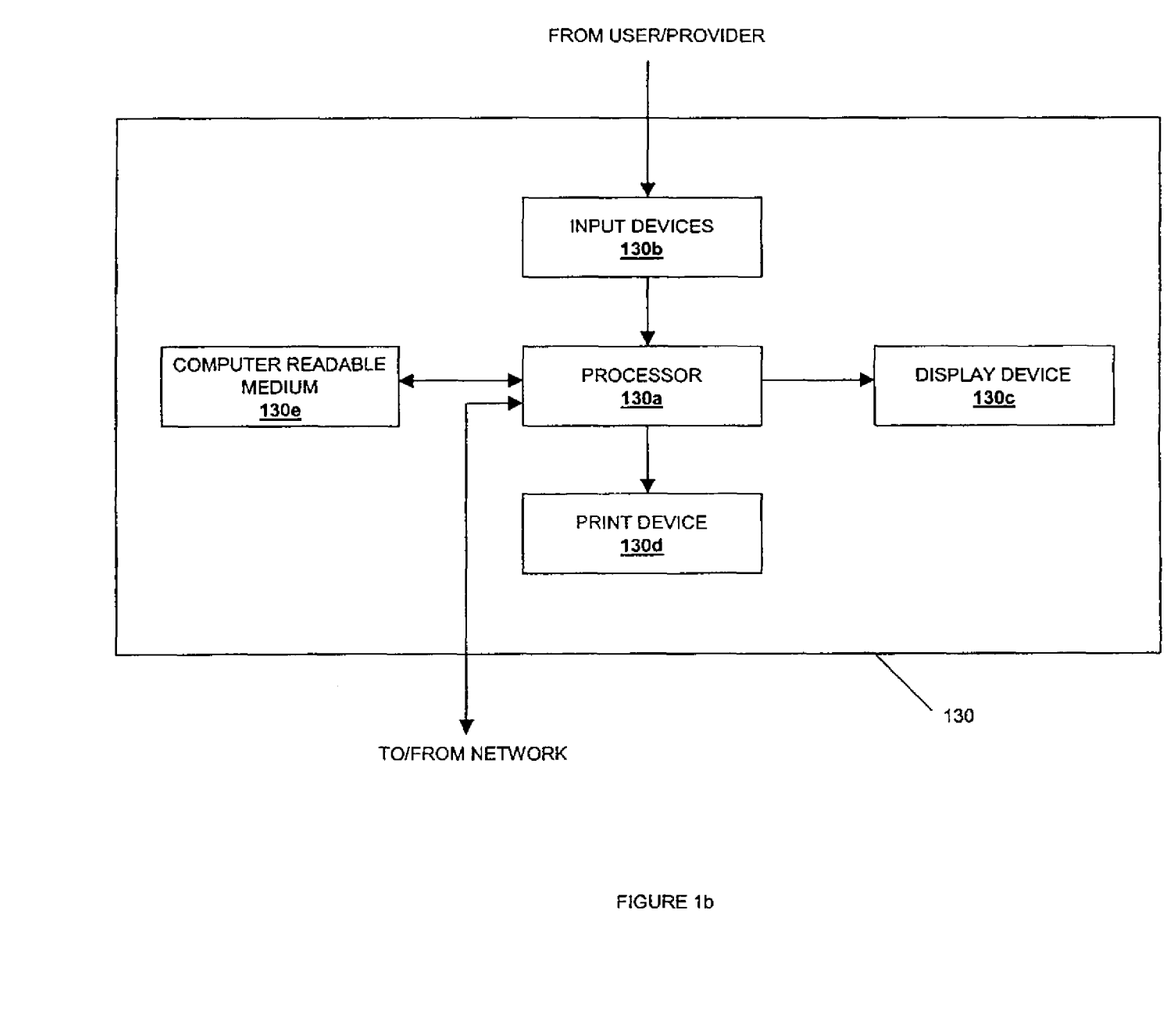
FIG. 1b is a block diagram illustrating an embodiment of a representative information handling system used in the system of FIG. 1.

Referring now to FIG. 1b, an IHS 130 which is representative of one of the IHS's described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to Signals from the processor 130a, the print device 130d prints visual images on paper.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the computer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the network 105 which is also a computer readable medium (or apparatus). Moreover, the memory device of the IHS 130 is itself a computer readable medium (or apparatus).

Figure 2:
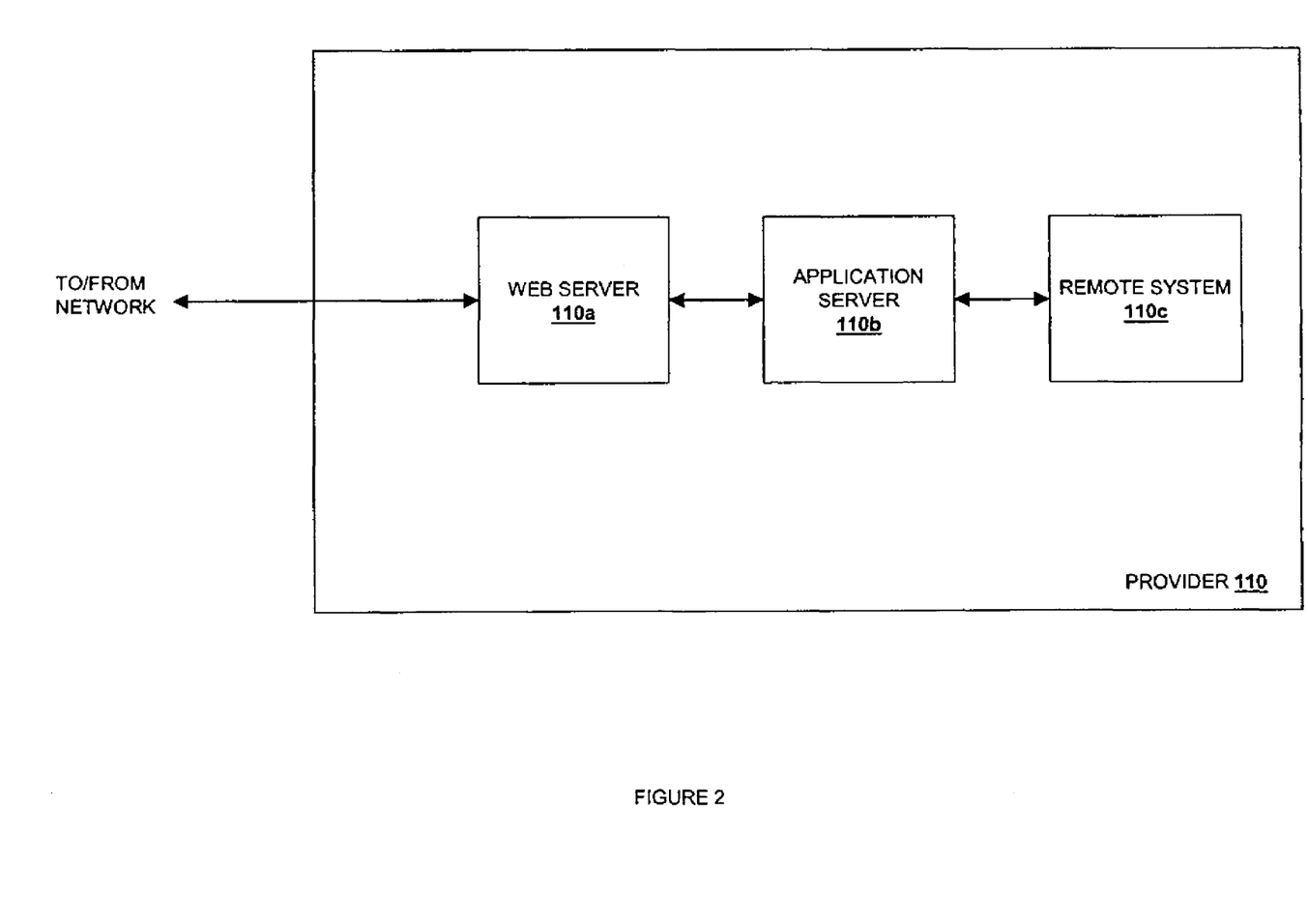
FIG. 2 is a block diagram illustrating an embodiment of a provider used in the system of FIG. 1.

Referring now to FIG. 2, the provider 110 is illustrated in more detail. A web server 110a such as, for example, a Hyper Text Transfer Protocol (HTTP) server, is included in the provider 110 and is operably coupled to the network 105, described above with reference to FIG. 1. An application server 110b, which may be the IHS 130 or which may include some or all of the components of the IHS 130, described above with reference to FIG. 1b, is included in the provider 110 and is operably coupled to the web server 110a. A remote system 110c such as, for example, a data source, a java database connectivity (JDBC) or a java connector architecture (J2C), is included in the provider 110 and is operably coupled to the application server 110h. In an embodiment, the remote system 110c may be located outside of the provider 110 but still operably coupled to the provider 110 and the application server 110b.

Figure 3A:
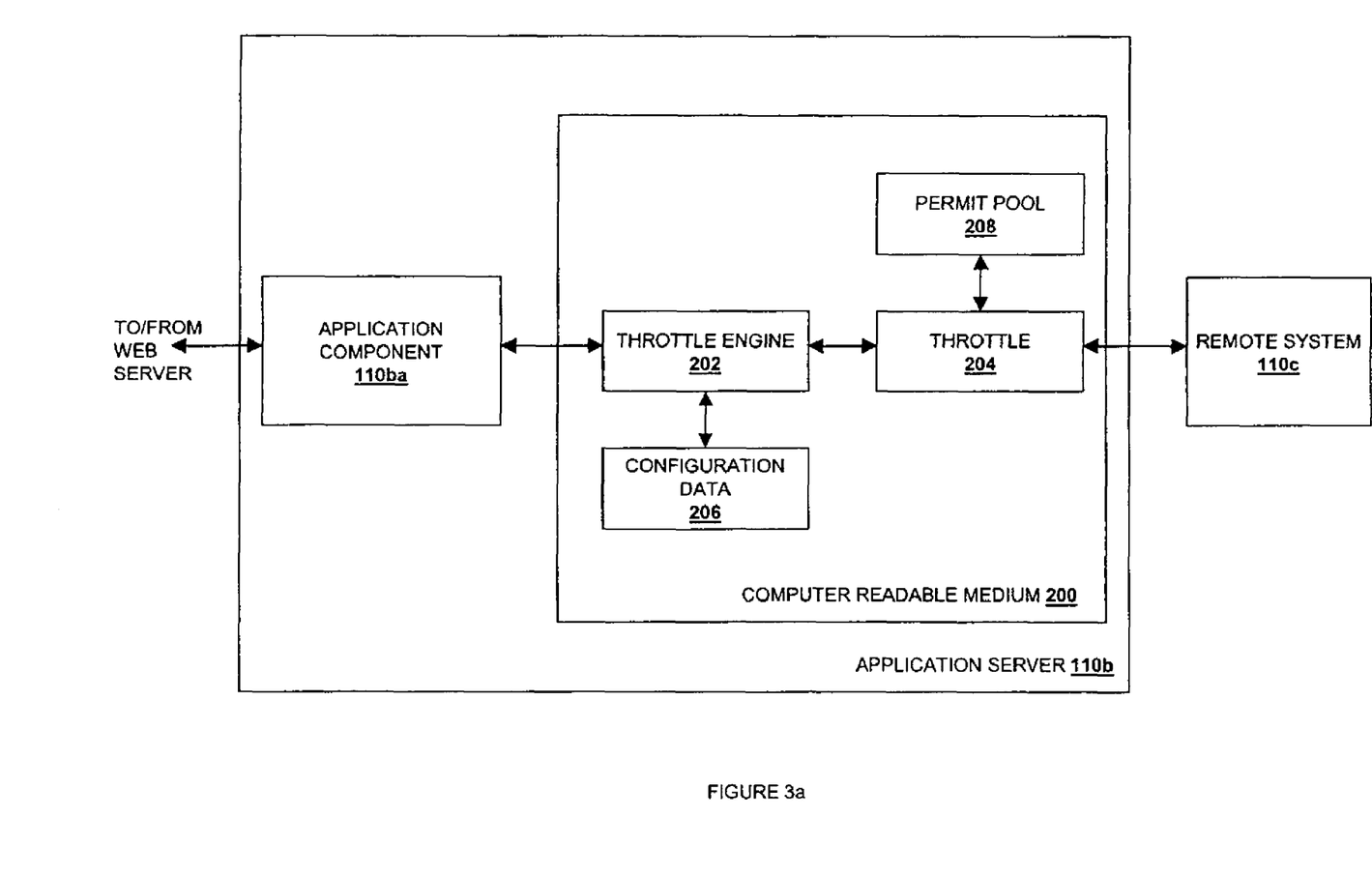
FIG. 3a is a block diagram illustrating an embodiment of an application server used in the provider of FIG. 2.

Referring now to FIG. 3a, the application server 110b is illustrated in more detail. An application component 110ba such as, for example, a servlet, a java bean, or an enterprise java bean (EJB), is included in the application server 110b and is operably coupled to the web server 110a, described above with reference to FIG. 2. A computer readable medium 200, which may be the computer readable medium 130e described above with reference to FIG. 1b, is included in the application server 110b and is operably coupled to the application component 110ba and the remote system 110c. The computer readable medium 200 includes a throttle engine 202 which is operably coupled to a throttle 204 and a set of configuration data 206. The configuration data 206 includes expected response time data which is the expected amount of time between the time a request to the remote system 110c is made and the time data is retrieved from the remote system 110c. The throttle 204 is operably coupled to the remote system 110c and a permit pool 208. The permit pool 208 includes a predetermined or limited number of permits available for attempting to access the remote system 110c.

Figure 3B:
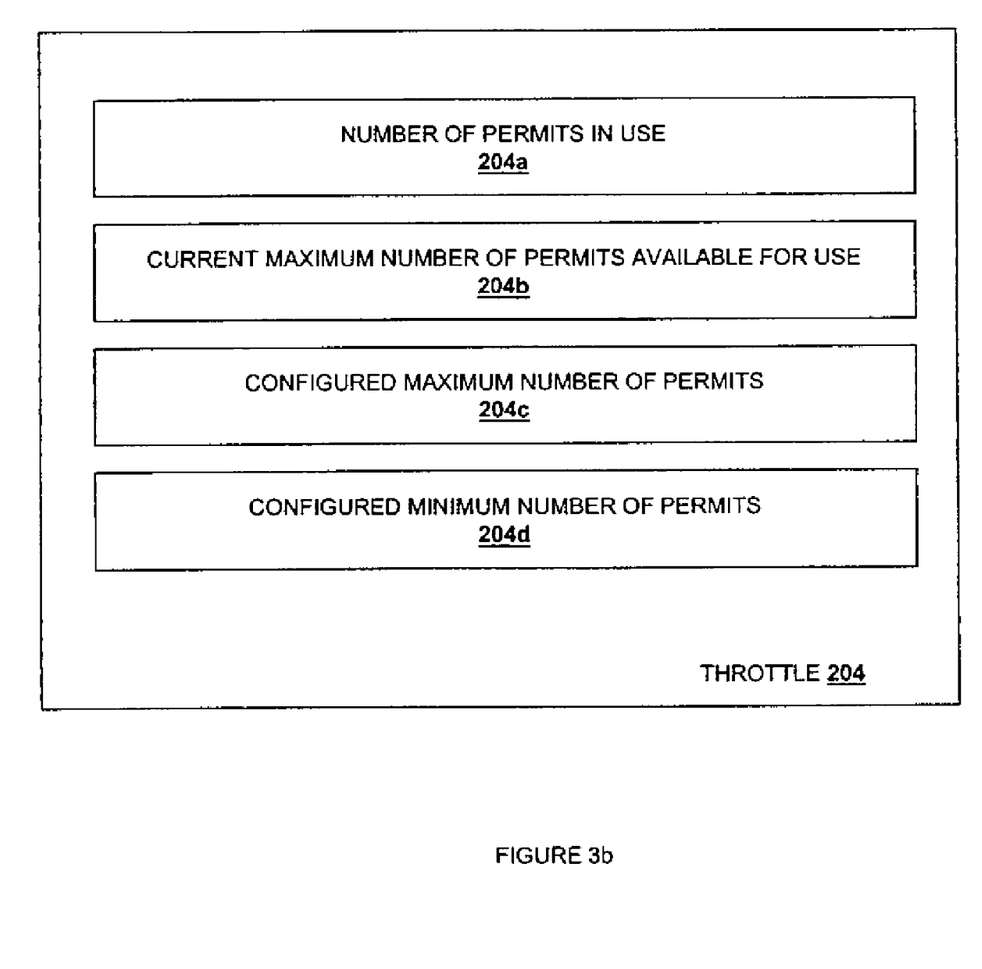

Referring now to FIGS. 3a and 3b, the throttle 204 keeps track of a number of variables which are related to the status of the permit pool 208 such as, for example, a number of permits in use 204a, a current maximum number of permits available for use 204b, a configured maximum number of permits 204c, and a configured minimum number of permits 204d. The number of permits in use 204a is the number of permits being used to attempt to access the remote system 110c at any given time. The current maximum number of permits available for use 204b is the number of permits currently available for use which dynamically changes depending on the operation of the remote system 110c, and is described in more detail below. The configured maximum number of permits 204c is the maximum number of permits which may be available for use at any given time. The configured minimum number of permits 204d is the minimum number of permits which may be available for use at any given time. Furthermore, the throttle 204 is operable to issue and deny permits to attempt to access the remote system 110c depending on the status of the number of permits in use 204a relative to the current maximum number of permits available for use 204b, which is described in more detail below.

Referring now to FIGS. 1, 2, 3a, 3b, 4a, 4b, and 4c, a method 300 for outage avoidance using the system 100 and the computer readable medium 200 is illustrated. The method 300 begins at step 302 where a plurality of the users 115, 120, and 125 are operably coupled to the provider 110 through the network 105.

Figure 4A:
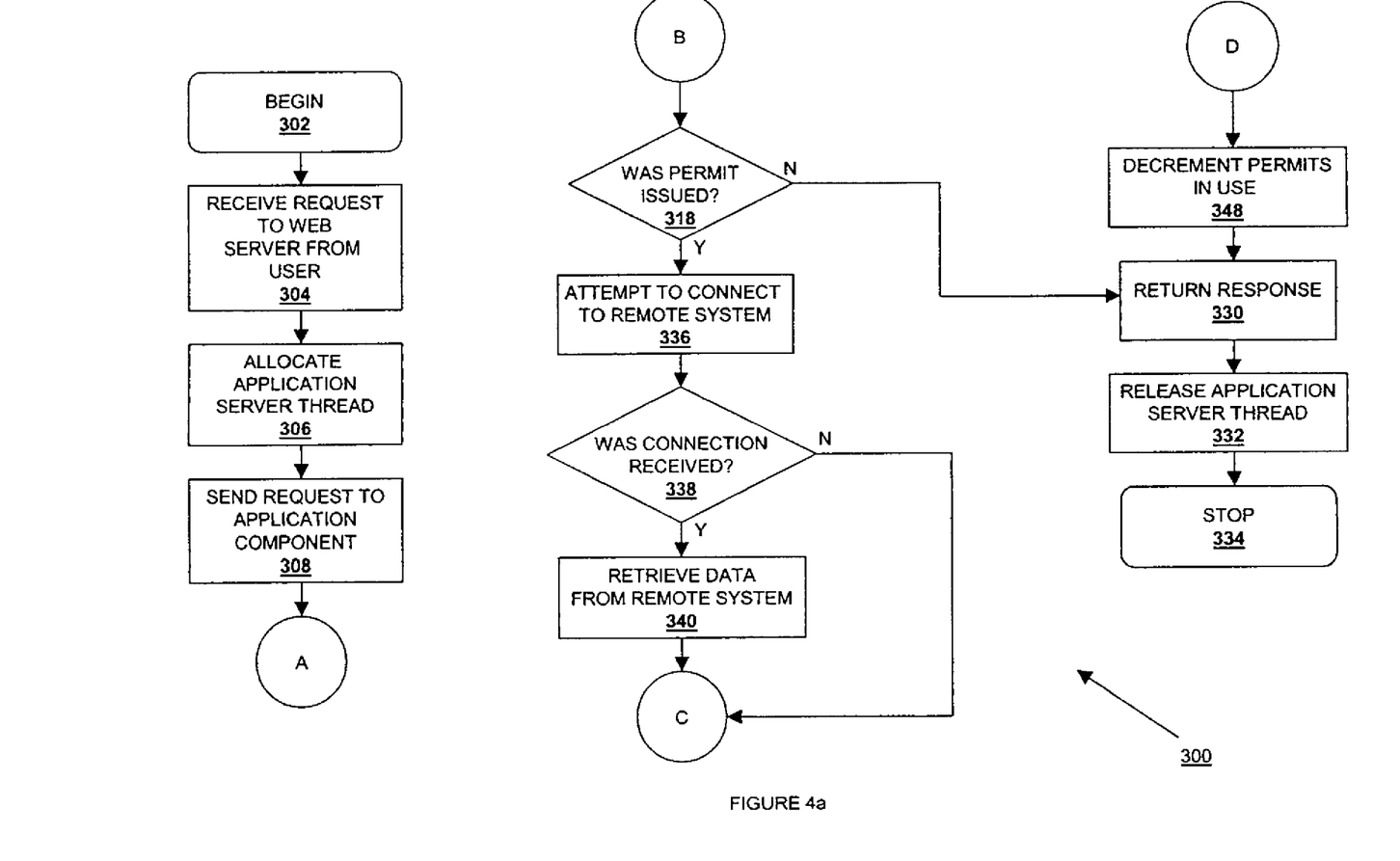
FIG. 4a is a flow chart illustrating an embodiment of a portion of a method for outage avoidance.

The method 300 then proceeds to step 304 where a request to the web server 110a is received from, for example, the user 115. The user 115 may send a request, for example, by inputting the request into the processor 130a using the input devices 130b. The processor 130a sends the request through the network 105 and it is received by the web server 110a of provider 110. In an embodiment, a plurality of requests may be sent by a plurality of different users including, for example, the users 120 and 125.

The method 300 then proceeds to step 306 where an application server thread is allocated for the request. The web server 110a informs the application server 110b of the request and an application server thread is allocated by the application server 110b in order to handle the request. The application server 110b may include a predetermined or limited number of application server threads available to handle requests and will stop handling requests once all the application server threads have been allocated. Thus, the efficient use of application server threads results in the efficient use of the application server 110b.

The method 300 then proceeds to step 308 where the request is sent to the application component 110ba. The web server 110a sends the request to the application component 110ba in the application server 110b.

The method 300 then proceeds to step 310 where a permit is requested. The application component 110ba informs the throttle engine 202 that a request for data from the remote system 110c has been made. The throttle engine 202 determines that the throttle 204 is the appropriate throttle which is operably coupled to the remote system 110c and informs the throttle 204 that a permit has been requested for the remote system 110c.

The method 300 then proceeds to decision block 312 where it is determined whether the number of permits in use 204a is less than the current maximum number of permits available for use 204b. The throttle 204 determines whether the number of permits in use 204a is less than the current maximum number of permits available for use 204b (e.g., whether there are any available permits which are not being used.) If the number of permits in use 204a is less than the current maximum number of permits available for use 204b (e.g., there are available permits which are not being used), the method proceeds to step 314 where the number of permits in use 204a in throttle 204 is incremented. The method then proceeds to step 316 where a permit for attempting to access the remote system 110c is issued to the throttle 204 from the permit pool 208. In an embodiment, the permit includes a timestamp of when the permit was obtained along with an expected response time for a request from the remote system 100c which is obtained from the configuration data 206 though the throttle engine 202. The method 300 then proceeds to decision block 318 to determine whether a permit was issued.

If, at step 312 of method 300, the number of permits in use 204a is equal to the current maximum number of permits available for use 204b (e.g., there are no available permits which are not being used), the method proceeds to step 320 where the throttle 204 determines whether the throttle queue is full. The throttle 204 will allow a predetermined or limited number of requests to be held in queue if there are no available permits which are not being used. In an embodiment, the throttle 204 will allow requests to be queued as long as the current maximum number of permits available for use 204b is greater than a predetermined percentage of the configured maximum number of permits 204c such as, for example, fifty percent of the configured maximum number of permits 204c. If the throttle queue is full, the method 300 proceeds to step 322 where the throttle 204 denies the permit request. The method 300 then proceeds to decision block 318 to determine whether a permit was issued.

If, in step 320 of method 300, the throttle queue is not full, the method 300 proceeds to step 324 where the request is held by the throttle 204. The method 300 then proceeds to decision block 326 where the throttle 204 determines whether the wait time for the queued request has exceeded the expected response time. If the wait time for the queued request has exceeded the expected response time, the method 300 proceeds to step 322 where the throttle 204 denies the permit request. The method 300 then proceeds to decision block 318 to determine whether a permit was issued.

If, in step 326 of method 300, the wait time for the queued request has not exceeded the expected response time, the method 300 proceeds to step 328 where the throttle 204 determines whether the wait time for the queued request has timed out. If the wait time for the queued request has not timed out, the method 300 returns to step 326 to determine whether the wait time for the queued request has exceeded the expected response time. If the wait time for the queued request has timed out, the method 300 proceeds back to step 310 where a permit is requested.

Figure 4B:
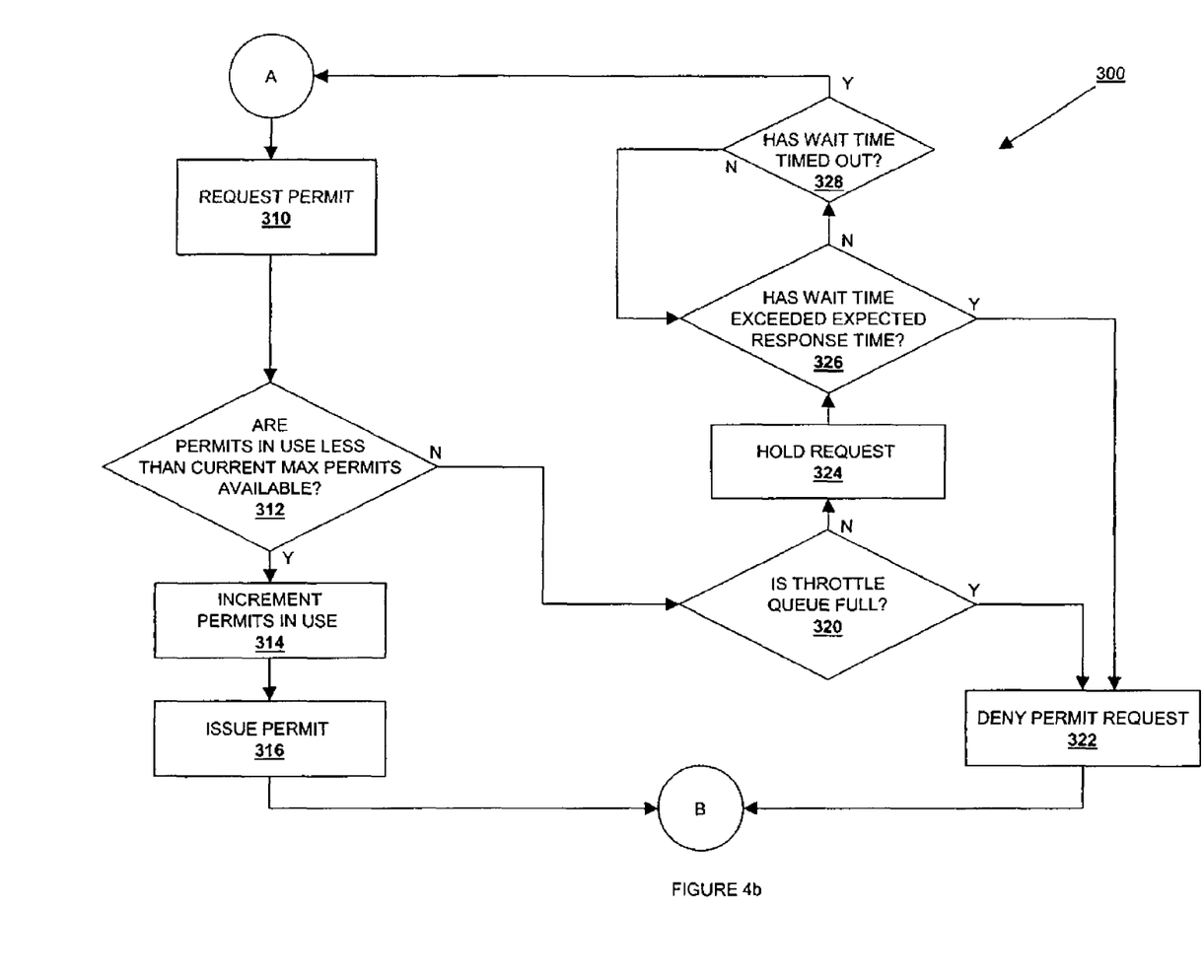
FIG. 4b is a flow chart illustrating an embodiment of a portion of a method for outage avoidance.

Once a permit has either been issued at step 316 or the permit request denied at step 322, the method 300 proceeds to decision block 318 where the throttle 204 determines whether a permit has been issued. If the throttle 204 determines that a permit has not been issued, the method 300 proceeds to step 330 where a response is returned. In an embodiment, the response returned at step 330 when a permit has not been issued includes responding that the remote system is unavailable. The method 300 then proceeds to step 332 where the application server 110b releases the application server thread, which was allocated to the request, in order to allow new requests to use that application server thread. The method 300 then proceeds to step 334 where the method 300 stops and waits for a new request.

If, at step 318, the throttle 204 determines that a permit has been issued, the method 300 proceeds to step 336 where the application component 110*ba* is allowed to attempt to connect to the remote system 110*c*.

The method 300 then proceeds to decision block 338 where the throttle 204 determines whether a connection was received by the application component 110*ba* from the remote system 110*c*. The application component will attempt to connect to the remote system 110*c* for a predetermined amount of time. After the predetermined amount of time is up, the attempt to connect will either have been received or will have timed out. If the connection was received by the application component 110*ba* from the remote system 110*e*, the method proceeds to step 340 where the application component 110*ba* retrieves the requested data from the remote system 110*c*. The method 300 then proceeds to step 342 where the throttle 204 releases the permit back to the permit pool 208. If, at step 338 of method 300, the connection was not received by the application component 110*ba* from the remote system 110*c* and has timed out, the method 300 proceeds to step 342 where the throttle 204 releases the permit back to the permit pool 208.

Figure 4C:
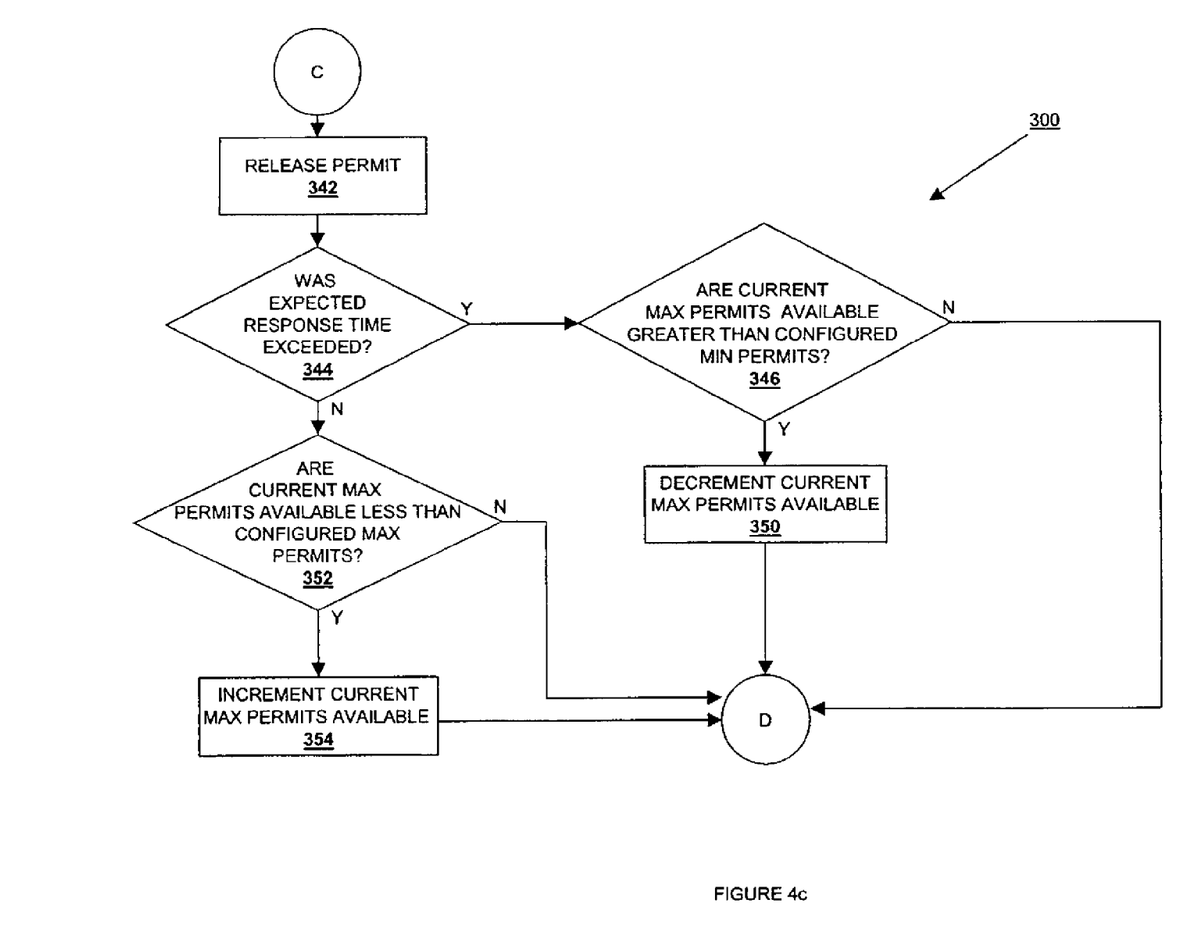
FIG. 4c is a flow chart illustrating an embodiment of a portion of a method for outage avoidance.

Once the permit has been released back to the permit pool 208 in step 342 of method 300, the method 300 proceeds to decision block 344 where the throttle 204 determines whether the expected response time for the request was exceeded. The permit contains a timestamp of when the permit was obtained along with the expected response time for the request. The throttle 204 uses the timestamp and the expected response time to determine whether the data took too longer to retrieve from the remote system than the expected response time. If the throttle 204 determines that the expected response time for the request was exceeded, the method 300 proceeds to decision block 346 where the throttle 204 determines whether the current maximum number of permits available for use 204*b* are greater than the configured minimum number of permits 204*d*. If the throttle 204 determines the current maximum number of permits available for use 204*b* are not greater than the configured minimum number of permits 204*d*, the method 300 proceeds to step 348 where the throttle decrements the number of permits in use 204*a*. The method 300 then proceeds to step 330 where a response is returned. In an embodiment, the response returned at step 330 when a connection was received from the remote system 110*c* and data was retrieved by the application component 110*ba* includes responding with the data which was requested. In an embodiment, the response returned at step 330 when a connection was not received from the remote system 110*c* and has timed out includes responding that the remote system is unavailable. The method 300 then proceeds to step 332 where the application server 110*b* releases the application server thread which was allocated to the request in order to allow new requests to use that application server thread. The method 300 then proceeds to step 334 where the method 300 stops and waits for a new request.

If, at decision block 346 of method 300, the throttle 204 determines the current maximum number of permits available for use 204*b* are greater than the configured minimum number of permits 204*d*, the method 300 proceeds to step 350 where the throttle 204 decrements the current maximum number of permits available for use 204*b*. The method 300 then proceeds to proceeds to step 348 where the throttle decrements the number of permits in use 204*a*. The method 300 then proceeds to step 330 where a response is returned. In an embodiment, the response returned at step 330 when a connection was received from the remote system 110*c* and data was retrieved by the application component 110*ba* includes responding with the data which was requested. In an embodiment, the response returned at step 330 when a connection was not received from the remote system 110*c* and has timed out includes responding that the remote system is unavailable. The method 300 then proceeds to step 332 where the application server 110*b* releases the application server thread which was allocated to the request in order to allow new requests to use that application server thread. The method 300 then proceeds to step 334 where the method 300 stops and waits for a new request.

If, at decision block 344 of method 300, the throttle 204 determines that the expected response time for the request was not exceeded, the method 300 proceeds to decision block 352 where the throttle determines whether the current maximum number of permits available for use 204*b* is less than the configured maximum number of permits 204*c*. In an embodiment, after determining that the expected response time for the request was not exceeded in step 344, the method 300 may check the issued permits to determine if they have been abandoned and, if the issued permits are determined to have been abandoned, the method 300 may increment the current maximum number of permits available for use 204*b*. If the throttle 204 determines the current maximum number of permits available for use 204*b* is not less than the configured maximum number of permits 204*c*, the method 300 proceeds to step 348 where the throttle decrements the number of permits in use 204*a*. The method 300 then proceeds to step 330 where a response is returned. In an embodiment, the response returned at step 330 when a connection was received from the remote system 110*c* and data was retrieved by the application component 110*ba* includes responding with the data which was requested. The method 300 then proceeds to step 332 where the application server 110*b* releases the application server thread which was allocated to the request in order to allow new requests to use that application server thread. The method 300 then proceeds to step 334 where the method 300 stops and waits for a new request.

If, at decision block 352 of method 300, the throttle 204 determines the current maximum number of permits available for use 204*b* is less than the configured maximum number of permits 204*c*, the method 300 proceeds to step 354 where the throttle 204 increments the current maximum number of permits available for use 204*b*. The method 300 then proceeds to step 348 where the throttle decrements the number of permits in use 204*a*. The method 300 then proceeds to step 330 where a response is returned. In an embodiment, the response returned at step 330 when a connection was received from the remote system 110*c* and data was retrieved by the application component 110*ba* includes responding with the data which was requested. The method 300 then proceeds to step 332 where the application server 110*b* releases the application server thread which was allocated to the request in order to allow new requests to use that application server thread. The method 300 then proceeds to step 334 where the method 300 stops and waits for a new request.

Thus, a system 100 is provided which will prevent a large number of requests which are sent from the application component 110*ba* from being held up when the remote system 110*c* is unavailable. As long as the number of permits in use 204*a* is less than the configured maximum number of permits 204*c*, requests for data from the remote system 110*c* may be sent to the remote system 110*c*. When the number of permits in use 204*a* are equal to the configured maximum number of permits 204*c*, the requests will be queued until the throttle queue is full, and then permits will be denied. Once permits are denied, a response that the remote system 110*c* is unavailable is returned and the application thread is released. Thus, if the remote system 110*c* is unavailable or too busy to handle a request, the request is denied immediately rather than held up waiting for a response timeout, which results in a better user experience and a more efficient use of application server threads.

Furthermore, as permits are issued and requests for data from the remote system 110c are sent, the system 100 keeps track of how long the remote system 110c is taking to satisfy the requests. If the remote system 110c is satisfying requests in an appropriate amount of time, the current maximum number of permits available for use 204b will equal the configured maximum number of permits 204c, and a number of requests equal to the current maximum number of permits available for use 204b will be able to be satisfied.

However, if the remote system 110c is not satisfying requests in an appropriate amount of time, the current maximum number of permits available for use 204b is decremented. As the current maximum number of permits available for use 204b is decremented, less permits will be issued, less requests will be held waiting for the remote system 110c to respond, and less application server threads will be allocated to access the remote system 110c. The current maximum number of permits available for use 204b will only be decremented down to the configured minimum number of permits 204d such that there will always be a minimum number of requests for data from the remote system 110c in order to allow the system 100 to detect when the remote system 110c becomes available.

After a period of time in which the remote system 110c has not been satisfying requests in an appropriate amount of time, the remote system 110c may begin to satisfy requests in an appropriate amount of time. When this happens, the current maximum number of permits available for use 204b is incremented. As the current maximum number of permits available for use 204b is incremented, more permits will be issued and, in turn, more requests will be sent to the remote system 110c. The current maximum number of permits available for use 204b will be incremented up to the configured maximum number of permits 204c. Thus, the current maximum number of permits available for use 204b may be dynamically adjusted in order to allow more requests to the remote system 110c when the remote system 110c is responding to requests in an appropriate amount of time and to allow less requests to the remote system 110c when the remote system 110c is not responding to requests in an appropriate amount of time, allowing the system 100 to save resources such as, for example, those resources related to application server threads, and resulting in an improved user experience as a majority of users on the system 100 will find out immediately when the remote system 110c is unavailable.

Figure 5:
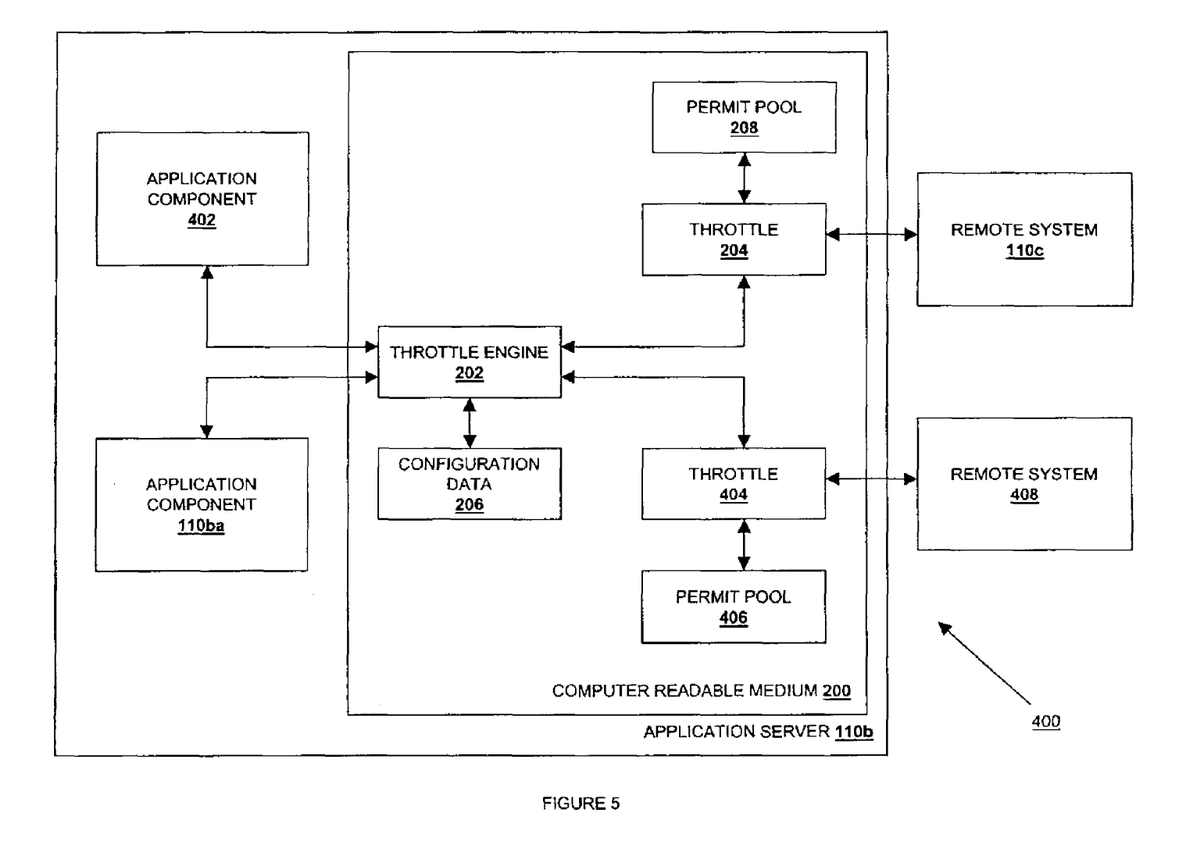
FIG. 5 is a block diagram illustrating an embodiment of an alternative application server used in the provider of FIG. 2.

Referring now to FIG. 5, an alternative embodiment, a system for outage avoidance 400 is substantially similar in design and operation to the system 100 including computer readable medium 200 described above with reference to FIGS. 1 at 1 b, 2, 3a, 3b, 4a, 4b, and 4c, with the provision of an additional application component 402, which is substantially similar to the application component 110ba, and is operably coupled to the throttle engine 202. An additional throttle 404, which is substantially similar to the throttle 204, is operably coupled to the throttle engine 202 and an additional permit pool 406, which is substantially similar to the permit pool 208. An additional remote system 408, which is substantially similar to the remote system 110c, is coupled to the throttle 404. The system 400 enables the outage avoidance system 100, described above with reference to FIGS. 1a, 1b, 2, 3a, 3b, 4a, 4b, and 4c, between the application components 402 and 110ba and the remote systems 110c and 408, respectively. In an embodiment, the system 400 may be expanded to include any number of application components and their respective remote systems.

Figure 6:
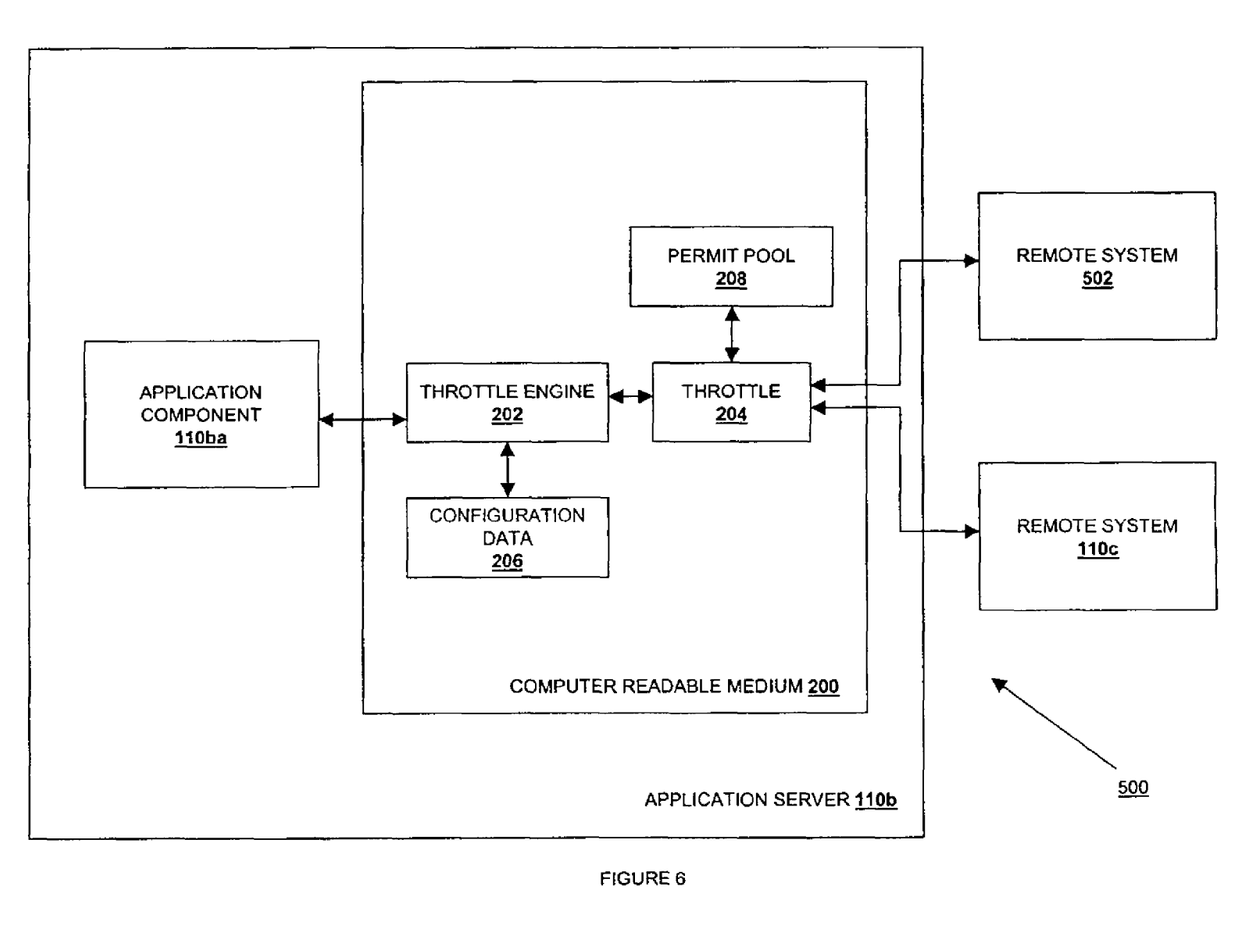
FIG. 6 is a block diagram illustrating an embodiment of an alternative application server used in the provider of FIG. 2.

Referring now to FIG. 6, an alternative embodiment, a system for outage avoidance 500 is substantially similar in design and operation to the system 100 including computer readable medium 200 described above with reference to FIGS. 1a, 1b, 2, 3a, 3b, 4a, 4b, and 4c, with the provision of an additional remote system 502, which is substantially similar to the remote system 110c, and is coupled to the throttle 204. The system 500 enables the outage avoidance system 100, described above with reference to FIGS. 1 a, 1 b, 2, 3a, 3b, 4a, 4b, and 4c, between the application component 110ba and the remote systems 110c and 502, respectively. For example, the remote systems 110c and 502 may be very closely related to each other, such that an outage in one of the systems results in an outage avoidance in the other, resulting in the need for only one throttle 204 for the remote systems 110c and 502. In an embodiment, the system 500 may be expanded to include any number of remote systems for the application component 110ba.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer-implemented system having a computing device with a processor and memory for storing executable instructions that are executable by the processor to:
    receive a request for a permit to access a remote system;
    determine whether a number of permits in use is equal to a current maximum number of permits available for use;
    in response to determining the number of permits in use is equal to the current maximum number of permits available for use, determine whether a throttle queue is full;
    in response to determining the throttle queue is not full, hold the request in the throttle queue;
    determine whether a wait time for the queued request has exceeded an expected response time;
    in response to determining the wait time has not exceeded the expected response time, determine whether the wait time for the queued request has timed out; and
    in response to determining the wait time has timed out, receive a request for the permit to access the remote system.

2. The computer-implemented system of claim 1, further including:
    determine whether the number of permits in use is less than the current maximum number of permits available for use; and
    increment the number of permits in use in response to determining that the number of permits in use is less than the current maximum number of permits available for use.

3. The computer-implemented system of claim 1, further including:
    issue a permit in response to determining that the number of permits in use is less than the current maximum number of permits available for use.

4. The computer-implemented system of claim 3, further including:
    providing a timestamp and an expected response time for the request when the permit is issued.

5. The computer-implemented system of claim 1, wherein determining whether a throttle queue is full includes:
   determining whether a predetermined number of requests to be held in the throttle queue is full; and
   in response to determining the predetermined number of requests to be held is the throttle queue is full, denying the request to access the remote system.

6. The computer-implemented system of claim 1, further including:
   denying the request to access the remote system in response to determining the wait time has exceeded the expected response time.

7. The computer-implemented system of claim 1, further including:
   determining whether a permit has been issued; and
   in response to determining the permit has not been issued, responding that the remote system is unavailable.

8. A computer-implemented method comprising:
   receiving a request for a permit to access a remote system;
   determining whether a number of permits in use is equal to a current maximum number of permits available for use;
   in response to determining the number of permits in use is equal to the current maximum number of permits available for use, determine whether a throttle queue is full;
   in response to determining the throttle queue is not full, hold the request in the throttle queue;
   determining whether a wait time for the queued request has exceeded an expected response time;
   in response to determining the wait time has not exceeded the expected response time, determine whether the wait time for the queued request has timed out; and
   in response to determining the wait time has timed out, receiving a request for the permit to access the remote system.

9. The computer-implemented method of claim 8, further including:
   determining whether the number of permits in use is less than the current maximum number of permits available for use; and
   incrementing the number of permits in use in response to determining that the number of permits in use is less than the current maximum number of permits available for use.

10. The computer-implemented method of claim 8, further including:
    issuing a permit in response to determining that the number of permits in use is less than the current maximum number of permits available for use.

11. The computer-implemented method of claim 10, further including:
    providing a timestamp and an expected response time for the request when the permit is issued.

12. The computer-implemented method of claim 8, wherein determining whether a throttle queue is full includes:
    determining whether a predetermined number of requests to be held in the throttle queue is full; and
    in response to determining the predetermined number of requests to be held is the throttle queue is full, denying the request to access the remote system.

13. The computer-implemented method of claim 8, further including:
    denying the request to access the remote system in response to determining the wait time has exceeded the expected response time.

14. The computer-implemented method of claim 8, further including:
    determining whether a permit has been issued; and
    in response to determining the permit has not been issued, responding that the remote system is unavailable.

15. A non-transitory computer readable medium having computer readable instructions stored thereon for:
    receiving a request for a permit to access a remote system;
    determining whether a number of permits in use is equal to a current maximum number of permits available for use;
    in response to determining the number of permits in use is equal to the current maximum number of permits available for use, determine whether a throttle queue is full;
    in response to determining the throttle queue is not full, hold the request in the throttle queue;
    determining whether a wait time for the queued request has exceeded an expected response time;
    in response to determining the wait time has not exceeded the expected response time, determine whether the wait time for the queued request has timed out; and
    in response to determining the wait time has timed out, receiving a request for the permit to access the remote system.

16. The non-transitory computer readable medium of claim 15, further including:
    determining whether the number of permits in use is less than the current maximum number of permits available for use; and
    incrementing the number of permits in use in response to determining that the number of permits in use is less than the current maximum number of permits available for use.

17. The non-transitory computer readable medium of claim 15, further including:
    issuing a permit in response to determining that the number of permits in use is less than the current maximum number of permits available for use.

18. The non-transitory computer readable medium of claim 17, further including:
    providing a timestamp and an expected response time for the request when the permit is issued.

19. The non-transitory computer readable medium of claim 15, wherein determining whether a throttle queue is full includes:
    determining whether a predetermined number of requests to be held in the throttle queue is full; and
    in response to determining the predetermined number of requests to be held is the throttle queue is full, denying the request to access the remote system.

20. The non-transitory computer readable medium of claim 15, further including:
    denying the request to access the remote system in response to determining the wait time has exceeded the expected response time.

21. The non-transitory computer readable medium of claim 15, further including:
    determining whether a permit has been issued; and
    in response to determining the permit has not been issued, responding that the remote system is unavailable.

* * * * *